United States Patent [19]

Komabashiri et al.

[11] Patent Number: 4,863,524

[45] Date of Patent: Sep. 5, 1989

[54] METHOD OF CLEANING THE INTERIOR OF POLYMERIZATION REACTOR

[75] Inventors: Takamichi Komabashiri; Toragoro Mitani, both of Takasago; Hiroaki Yamauchi, Kakogawa; Hideo Yasui, Kobe, all of Japan

[73] Assignee: Kanegafuchi Chemical Industry Co., Ltd., Osaka, Japan

[21] Appl. No.: 241,771

[22] Filed: Sep. 7, 1988

Related U.S. Application Data

[63] Continuation of Ser. No. 57,877, Jun. 2, 1987, abandoned.

[30] Foreign Application Priority Data

Jun. 6, 1986 [JP] Japan .................... 61-132575

[51] Int. Cl.$^4$ ................................ B08B 9/00
[52] U.S. Cl. ...................... 134/22.19; 134/2; 134/7; 134/22.13; 134/22.14; 134/22.17; 252/174; 252/DIG. 8; 526/74; 526/319
[58] Field of Search ............. 134/2, 7, 22.1, 22.13, 134/22.14, 22.16, 22.17, 22.19, 38, 39; 526/74, 319; 252/174, DIG. 8; 528/484

[56] References Cited

U.S. PATENT DOCUMENTS

| | | | |
|---|---|---|---|
| 2,810,665 | 10/1957 | Szayna .................... | 134/22.19 |
| 3,005,734 | 10/1961 | Elis ........................ | 134/22.19 |
| 3,070,548 | 12/1962 | Brooke ................... | 134/22.19 |
| 3,475,218 | 10/1969 | Torrenzano et al. ..... | 134/22.19 |
| 3,619,295 | 11/1971 | Nishizaki ................ | 134/22.19 |
| 3,653,964 | 4/1972 | Yamamoto et al. ..... | 134/22.17 |
| 3,740,267 | 6/1973 | Yaylock .................. | 134/22.17 |
| 3,865,628 | 2/1975 | Callahan et al. ........ | 134/22.17 |
| 3,998,655 | 12/1976 | Benetta et al. .......... | 134/22.19 |
| 4,468,257 | 8/1984 | Kaneko et al. .......... | 134/22.17 |

FOREIGN PATENT DOCUMENTS

| | | | |
|---|---|---|---|
| 949840 | 2/1970 | Canada ................... | 134/22.19 |
| 7342222 | 9/1970 | Japan ..................... | 134/22.17 |
| 539065 | 9/1974 | U.S.S.R. ................. | 264/39 |

Primary Examiner—Asok Pal
Attorney, Agent, or Firm—Jordan and Hamburg

[57] ABSTRACT

A cleaning method for removing scales, etc., deposited on the interior of a polymerization reactor which has been used in emulsion or suspension polymerization. This method uses a chemical cleanser comprising a soap builder an, alkali agent, an aqueous solution or dispersion of a surfactant, and an organic solvent and/or polymerizable monomer. This system may further contain a plastic packing such as tellerettes. By this method, scales deposited on the interior of a polymerization reactor, particularly, scales deposited on the inside surface, agitator, and baffle-plates of the reactor, are compeltely removed.

41 Claims, No Drawings

4,863,524

METHOD OF CLEANING THE INTERIOR OF POLYMERIZATION REACTOR

This application is a continuation of application Ser. No. 057,877 filed June 2, 1987, now abandoned.

BACKGROUND OF THE INVENTION

This invention relates to a method of cleaning the interior of a polymerization reactor. More particularly, it relates to a method of removing scales or other materials deposited on the inside of a polymerization reactor used in emulsion polymerization or suspension polymerization.

Plant cleaning techniques include mechanical cleaning and chemical cleaning. The mechanical cleaning includes a high-pressure jet cleaning, a blast cleaning, and a pig cleaning. The chemical cleaning includes an alkali cleaning, an acid cleaning, and an emulsion cleaning. The alkali cleaning is generally used for removing oils and fats by use of caustic soda, sodium carbonate, etc. The acid cleaning is usually used for cleaning and removing inorganic scales, etc., with hydrochloric acid, sulfuric acid, nitric acid, phosphoric acid, etc. The emulsion cleaning is adapted to cleaning and removing oils and fats with a surfactant, etc.

To remove the scales deposited on the interior of the polymerization reactor such as the inside surface of the reactor, an agitator, and baffle-plates, mechanical cleaning is generally used, particularly, high-pressure jet cleaning. It is usually difficult, however, for the high-pressure jet cleaning to remove scales completely. In addition, to apply a scale deposition preventing agent having a chelate forming function on the inside surface of polymerization reactor, it is necessary to completely clean the inside surface of the reactor in advance. The high-pressure jet cleaning cannot be used for such a purpose since it does not completely remove scales.

SUMMARY OF THE INVENTION

It is an object of the present invention to provide a method for completely removing scales deposited on the interior of a polymerization reactor, particularly, those scales deposited during polymerization on various parts such as the inside surface of the reactor, agitator, and baffle-plates.

This object is attained by cleaning through agitating under heating with a chemical detergent system comprising a soap builder, an alkali agent, an aqueous solution or aqueous dispersion of a surfactant, and an organic solvent and/or a polymerizable monomer, as it is or in the presence of a plastic packing such as tellerettes.

This invention provides for a method of cleaning the interior of a polymerization reactor wherein are cleaned the interior such as the inside surface, an agitator, and baffle-plates of a polymerization reactor which has been used for emulsion polymerization or suspension polymerization of a single or a mixture of polymerizable monomers in the presence of an initiator, characterized in that the cleaning is conducted with a chemical detergent system comprising a soap builder of sodium or potassium compound or compounds, an alkali agent, an aqueous solution or a dispersion of a surfactant, an organic solvent and/or polymerizable monomer or further in the presence of a packing made of plastic, by agitating under heating.

DETAILED DESCRIPTION OF THE PREFERRED EMBODIMENTS

The apparatus intended for cleaning by the method of the present invention is a polymerization reactor which has been used in emulsion polymerization or suspension polymerization. Preferable are apparatus used for emulsion polymerization of a single acrylic ester monomer or methacrylic ester monomer or a mixture thereof, or for emulsion polymerization of butadiene or styrene and/or substituted styrene. The substituted styrene includes $\alpha$-methylstyrene, vinyltoluene, ortho-chlorostyrene. Other preferable apparatus include a polymerization reactor for manufacturing polyvinyl chloride resin by suspension polymerization, that for manufacturing paste resin of polyvinyl chloride, that for manufacturing polystyrene beads by suspension polymerization, and that for manufacturing copolymers of acrylonitrile and vinyl chloride by emulsion polymerization.

The soap builder used in the invention includes an alkali builder. Examples of the soap builder are sodium metasilicate, sodium orthosilicate, sodium silicate, sodium orthophosphate, sodium pyrophosate, sodium tripolyphosphate, sodium hexametaphosphate, and potassium metasilicate.

The alkali agent includes caustic soda, sodium carbonate, sodium bicarbonate, caustic potash, potassium carbonate, and potassium bicarbonate.

The surfactant is preferably excellent in wet permeability, emulsifiability force, and dispersibility, and has a strong detergency. More preferably, it has an excellent biodegradability. Examples of the surfactants satisfying such requirements are (1) anionic surfactants such as fatty acid salts like semihardened potassium soap of beef tallow fatty acid, semihardened sodium soap of beef tallow fatty acid, potassium soap of oleic acid, potassium soap of castor oil, sodium soap of stearic acid, solid bar or solid flake sodium soap of mixed fatty acid; naphthalenesulfonic acid-formaldehyde condensate such as sodium salt of $\beta$-naphthalenesulfonic acid-formaldehyde condensate; alkylnaphthalenesulfonate such as sodium alkylnaphthalenesulfonate; alkylsulfosuccinate such as sodium dialkylsulfosuccinate; and alkyldiphenyl ether disulfonate such as sodium alkyldiphenyl ether disulfonate: (2) nonionic surfactants such as polyoxyethylene alkyl ether like polyoxyethylene nonylphenyl ether and polyoxyethylene octylphenyl ether, and polyoxyethylene derivatives: and (3) ampholytic surfactants such as lauryl betaine and lauryldimethylamine oxide.

Among these, particularly preferable are anionic surfactants and nonionic surfactants.

The organic solvent and/or polymerizable monomer decreases the deposition of scales on the walls by swelling the polymerized scales to heighten the cleaning effect of the chemical detergent solution comprising soap builder, alkali agent, and surfactant. In the system further containing a plastic packing, it is expected that the packing heightens the cleaning effect.

The organic solvent used for such a purpose has preferably a solubility parameter (hereinafter called SP) of 10 or less. Examples of the organic solvent are tetrahydrofuran (SP: 9.32), acetone (SP: 9.71), methylethyl ketone (SP: 9.04), methyl isobutyl ketone (SP: 9.56), methyl n-butyl ketone (SP: 9.92), methyl n-propyl ketone (SP: 9.98), dioxane (SP: 9.73), toluene (SP: 8.9), benzene (SP: 9.2), xylene (SP: 8.8-9.0), chlorobenzene (SP: 9.5), chloroform (SP: 9.2), ethyl acetate (SP: 9.0), tetrachloroethylene (SP: 9.3) and mixtures thereof. Either of water-soluble organic solvents or water-insoluble organic solvents can be used, but waterinsoluble solvents are particularly effective, and waterinsoluble organic solvents having an SP value of 10 or less are preferable. Among the water in soluble solvents having an SP value of 10 or less, more preferable in view of the boiling point and detergency are toluene and xylene; particularly toluene is superior. It is preferable that the specific gravity of the organic solvent is close to that of the chemical detergent comprising a soap builder, an alkali agent, and a surfactant. Toluene and xylene satisfy this requirement, and tetrachloro ethylene is rather remote to this requirement.

The polymerizable monomer used in the invention includes styrene, methylacrylate, ethyl acrylate, methyl methacrylate, ethyl methylacrylate, and butadiene, among which methyl methacrylate is particularly preferable. Joint use of toluene and methyl methacrylate is also favorable.

In this invention, one or two or more types of the soap builder, one or two or more types of alkali agent, one or two or more types of surfactant, and one or two or more types of organic solvent and/or monomer are selectively used.

The mechanism of cleaning, i.e., removing stains from metal surfaces, has been explained by the following two combined effects:

(1) The effect of pulling the stain apart from the metal surface into the cleaning solution; and (2) The effect of preventing redeposition of the stains by keeping them stable in the cleaning solution.

The effect (1) is explained in that the detergent decreases the interfacial free energy between the stains and metal, and liberates the stains from the metal into the cleaning solution by the mechanical action or the interfacial potential between the stains and metal. The effect (2) is explained in that the hydration layer or electric charge given by the and absorbed to the metal or stains prevents the redeposition of the stains. In the scale removal from the metal surface, it is also explained that the soap builder, alkali agent, organic solvent and/or polymerizable monomer, and surfactant effects chemical cleaning by the effects (1) and (2).

Preferable combinations of the soap builder, alkali agent, organic solvent and/or polymerizable monomer, and surfactant are (1) sodium metasilicate, caustic soda, toluene, and semihardened potassium soap of beef tallow fatty acid, (2) sodium metasilicate, caustic sods, toluene, and sodium salt of $\beta$-naphthalene sulfonic acid-formaldehyde condensate, (3) sodium orthosilicate, caustic soda, toluene, and semihardened potassium soap of beef tallow fatty acid, (4) sodium tripolyphosphate, caustic soda, toluene, semihardened potassium soap of beef tallow fatty acid, (5) sodium metasilicate, caustic soda, toluene, alkyldiphenyl ether sodium disulfonate, and polyoxyethylene nonyl phenyl ether, (6) sodium metasilicate, caustic soda, xylene, and sodium dialkylsulfosuccinate, and (7) sodium metasilicate, caustic soda, xylene, and alkyldiphenyl ether sodium disulfonate.

The concentrations of these soap builder, alkali agent, surfactant and quantities of organic solvent and/or monomer to be used are, although depending upon the type of chemicals used: 0.01–50 w/v %, preferably 0.1–30 w/v %, more preferably 0.5–10 w/v % for the soap builder; 0.01–30 w/v %, preferably 0.1–10 w/v %, more preferably 0.5–5 w/v % for the alkali agent; and 0.01–10 w/v %, preferably 0.1–5 w/v %, more preferably 0.3–2 w/v % for the surfactant. The organic solvent and/or polymerizable monomer are used in the proportion of 1:0.01–10, preferably 1:0.1–3, more preferably 1:0.3–1 based on the aqueous detergent solution layer. If the concentration of the soap builder, alkali agent, or surfactant is too low, sufficient cleaning effects cannot be obtained. Even with these concentrations excessively raised, increase of cleaning effects cannot be expected. If the quantity of the organic solvent and/or polymerizable monomer used is too small, sufficient cleaning effects cannot be obtained. Even with these quantities excessively raised, an increase of cleaning effect cannot be expected.

The soap builder, alkali agent, and surfactant are completely dissolved in water. In very rare cases, however, some may remain not dissolved. In such a case, it is required to stir them to disperse uniformly. If the organic solvent is water soluble, the organic solvent and/or polymerizable monomer are dissolved in this solution. But if the organic solvent is water insoluble, the organic solvent and/or polymerizable monomer are separated into two layers from the aqueous solution. In such a case, it is necessary to disperse them uniformly in the aqueous solution by means such as agitating.

It is effective for a more complete cleaning to make a second step cleaning, after the first step cleaning, with an addition of an anionic surfactant to present reattachment of the scales which have been liberated in the first step. The anionic surfactant used in the second step cleaning includes condensates of naphthalenesulfonic acid and formaldehyde, alkylnaphthalenesulfonate, alkylsulfosuccinate, and alkyldiphenyl ether disulfonate, and particularly preferable is a fatty acid salt such as semihardened potassium soap of beef tallow fatty acid.

To add mechanical detergency to the chemical detergency, the invention contemplates adding a plastic packing to the above chemical detergent system and agitating the object under heating to effect cleaning.

As the plastic packing, those used in general packed columns are favorably used, and available are, for example, tellerette made of polypropylene, ballast saddle made of polypropylene, ballast ring made of polypropylene, cascade mini ring made of polypropylene, and ballast saddle made of polyethylene. The size of these packings in 0.1–20 cm, preferably 1–10 cm in diameter. The quantity of these packings to be used in 0.1–50 v/v %, preferably 1–30 v/v % based on the total volume of the cleaning solution or dispersion comprising the soap builder, alkali agent, surfactant, water, organic solvent and/or polymerizable monomer.

The material of the polymerization reactor, agitator, and baffle-plates may be metal such as stainless steel (SUS 304, 316, 316L, etc.) or glass lined steel. For glass lined steel, however, special consideration may be necessary, in case the resistance against alkali may be insufficient.

The feed of detergent system into the polymerization reactor may be in the order of water and then the detergent system, or vice versa. Also, the aqueous detergent solution may be prepared in a vessel other than the polymerization reactor and fed into the reactor with a pump. Since the inside of the polymerization reactor may be filled with the vapor of the organic solvent and/or monomer, it is preferable to make safety provision such as replacing with nitrogen.

The aqueous detergent solution or dispersion is held at a temperature of 100° C. or less, preferably at 40°–90° C. by means of the jacket and/or heating coil of the polymerization reactor, and agitated by an agitator, etc. to effect chemical cleaning. Cleaning time is 0.1–96 hours, preferably 0.2–48 hours for the first cleaning step, and 0.1–72 hours, preferably 0.2–24 hours for the second cleaning step. Since no continuous monitoring is required during cleaning, such method as leaving the reactor agitated under heating overnight or a whole day and night is favorably performed.

According to the cleaning method of the present invention, scales deposited on the interior of a polymerization reactor, particularly, deposited on the inside surface of the reactor, agitator, and baffle-plates during polymerization can be completely removed.

It is preferable to apply on the inside surfaces of the reactor, agitator, and baffle-plates, for example, a scale deposition preventing agent having a chelate forming function, but it is not mandatory. A polymerization reactor which has had applied thereto a scale deposition preventing agent gives a more remarkable chemical cleaning effect than a reactor which has not.

Examples of the embodiments of this invention will now be described with respect to an emulsion polymerization system and a suspension polymerization system. A polymerization system which contains an acrylic ester monomer, methacrylic ester monomer, or a mixture thereof is adapted to the method of this invention and described in detail. However, the invention is not limited to these.

EXAMPLE 1

The surface of a test piece 20 mm wide and 100 mm long made of stainless steel (SUS 304) #400 buff finished was further subjected to electropolishing. Into a lidded 1-l glass reactor, 560 ml of styrene-butadiene copolymer latex (solid content 30%), 320 ml of deionized water, 0.012 g of sodium ethylenediaminetetraacetate, 0.003 g of ferrous sulfate, and 0.2 g of rongalite were put. The inside temperature was adjusted to 60° C., and after adding 60 ml of potassium sulfate solution (6.5% aqueous solution), 75 ml of methyl methacrylate containing 0.15 g of cumene hydroperoxide was added in 25-ml section every 30 min and polymerized for 3 hours. Then, 0.3 g of cumene hydroperoxide was added and polymerized one hour. The above test piece was immersed in the latex to deposit scales on the surface of the test piece. The test piece with the scales deposited was dried at 80° C. for one hour, and the polymerization operation was repeated once more. After drying at 80° C. for one hour again, the test piece was dried at 100° C. for another hour.

A scale peeling test was conducted in such a manner that the obtained test piece with scales deposited thereon was immersed in a 4-l stainless steel bath containing the soap builder, alkali agent, organic solvent, polymerizable monomer, and surfactant. The test conditions and results are shown in Table 1.

TABLE I

| Item | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Soap builder | | | | | | | | | | | | | | | | | | | | | | | | |
| Sodium metasilicate | (W/V%) | 4.0 | 4.0 | 4.0 | 10.0 | 1.0 | | | | | | | | 4.0 | 4.0 | 4.0 | 1.0 | 4.0 | 4.0 | 4.0 | 4.0 | 20.0 | 4.0 | 4.0 |
| Sodium orthosilicate | (W/V%) | | | | | | 4.0 | | | | | | | | | | | | | | | | | |
| Sodium silicate | (W/V%) | | | | | | | 4.0 | | | | | | | | | | | | | | | | |
| Sodium orthophosphate | (W/V%) | | | | | | | | 2.0 | | | | | | | | | | | | | | | |
| Sodium pyrophosphate | (W/V%) | | | | | | | | | 2.0 | | | | | | | | | | | | | | |
| Sodium tripolyphosphate | (W/V%) | | | | | | | | | | 2.0 | | | | | | | | | | | | | |
| Sodium hexametaphosphate | (W/V%) | | | | | | | | | | | 2.0 | 2.0 | | | | | | | | | | | |
| Alkali agent | | | | | | | | | | | | | | | | | | | | | | | | |
| Caustic soda | (W/V%) | 1.0 | 1.0 | 1.0 | 1.0 | 1.0 | 1.0 | 1.0 | 1.0 | 1.0 | 1.0 | 1.0 | 1.0 | | | 1.0 | 1.0 | 1.0 | 1.0 | 1.0 | 1.0 | 1.0 | 1.0 | 1.0 |
| Sodium carbonate | (W/V%) | | | | | | | | | | | | | 1.0 | | | | | | | | | | |
| Sodium bicarbonate | (W/V%) | | | | | | | | | | | | | | 1.0 | | | | | | | | | |
| Organic solvent, monomer | | | | | | | | | | | | | | | | | | | | | | | | |
| Benzene Organic layer:water layer | (vol:vol) | 1:1 | | | | | | | | | | | | | | | | | | | | | | |
| Toluene | (vol:vol) | | 1:1 | | | | | | | | | | | | | | | | | | | | | |
| Xylene | (vol:vol) | | | 1:1 | | | | | | | | | | | | | | | | | | | | |
| Tetrachloroethylene (Perclene) | (vol:vol) | | | | 1:1 | | | | | | | | | | | | | | | | | | | |
| Methyl methacrylate | (vol:vol) | | | | | 1:1 | | | | | | | | | | | | | | | | | | |
| | | | | | | | 1:1 | 1:1 | 2:1 | 1:1 | 1:1 | 1:1 | 1:1 | 1:1 | 1:1 | 2:2 | 1:1 | 1:1 | 1:1 | 1:1 | 1:1 | 1:1 | 1:1 | 1:1 |
| Surfactant | | | | | | | | | | | | | | | | | | | | | | | | |
| *Anionic* | | | | | | | | | | | | | | | | | | | | | | | | |
| Semihardened potassium soap of beef tallow fatty acid | (W/V%) | 0.5 | 0.5 | 0.5 | 0.5 | 0.5 | 0.5 | 0.5 | 0.5 | 0.5 | 0.5 | 0.5 | 0.5 | 0.5 | 0.5 | | | | | | | | | |
| Sodium slat of β-naphthalene-sulfonic acid-formaldehyde condensate | (W/V%) | | | | | | | | | | | | | | | 0.5 | | | | | | | | |
| Sodium alkylnaphthalenesulfonate | (W/V%) | | | | | | | | | | | | | | | | 0.5 | | | | | | | |
| Sodium dialkylsulfosuccinate | (W/V%) | | | | | | | | | | | | | | | | | 0.5 | | | | | | |
| Sodium alkyldiphenyl ether disulfonate | (W/V%) | | | | | | | | | | | | | | | | | | 0.5 | | | | | |
| *Nonionic* | | | | | | | | | | | | | | | | | | | | | | | | |
| Polyoxyethylene nonylphenyl ether A* | (W/V%) | | | | | | | | | | | | | | | | | | | 0.5 | | | | |
| Polyoxyethylene nonylphenyl ether B** | (W/V%) | | | | | | | | | | | | | | | | | | | | 0.5 | | | |
| Polyoxyethylene derivative | (W/V%) | | | | | | | | | | | | | | | | | | | | | 0.5 | | |
| *Ampholytic* | | | | | | | | | | | | | | | | | | | | | | | | |
| Lauryl betaine | (W/V%) | | | | | | | | | | | | | | | | | | | | | | 0.5 | |
| Lauryldimethylamine oxide | (W/V%) | | | | | | | | | | | | | | | | | | | | | | | 0.5 |
| Treating temperature | (°C.) | 60 | 60 | 60 | 60 | 60 | 60 | 60 | 60 | 60 | 60 | 60 | 60 | 60 | 60 | 60 | 60 | 60 | 60 | 60 | 70 | 60 | 60 | 60 |
| Time required for natural peeling off of scales | (Hr.) | 0.2 | 0.2 | 0.3 | 1.0 | 0.5 | 0.3 | 0.5 | 0.3 | 0.5 | 0.5 | 0.3 | 0.3 | 0.5 | 0.5 | 0.2 | 0.5 | 0.5 | 0.5 | 0.5 | 0.5 | 0.5 | 0.5 | 0.5 |

*EMULGEN 909 made by Kao Soap Co.
**EMULGEN 910 made by Kao Soap Co.

EXAMPLE 2

A scale deposition preventing agent of a quinone-amine compound was applied to the inside surfaces, an agitator shaft and blades, and baffle-plates of a 3-l stainless steel polymerization reactor with agitator, and dried. In the reactor, methyl methacrylate was graft polymerized to styrene-butadiene copolymer latex. After 12 repetitions of the polymerization, a thin deposit of the polymer scale was found on the inside walls when the polymer latex was taken out. After washing the scales with water, a chemical cleaning was applied to the scales with the following cleaning chemicals:

| Cleaning chemicals | Concentrations (w/v %) |
|---|---|
| Sodium metasilicate ($Na_2SiO_3.9H_2O$) | 4.0 |
| Caustic soda (NaOH) | 1.0 |
| Semihardened potassium soap of beef tallow fatty acid (anionic surfactant) | 0.5 |
| Toluene | 1:1 |
| Toluene layer: water layer (vol:vol) | |

Cleaning chemicals were agitated at 65° C. for 6 hours. All the scales deposited on the inside walls were naturally peeled off.

EXAMPLE 3

In a 100-l stainless steel polymerization reactor with agitator, styrene and butadiene were emulsion polymerized to give styrene-butadiene copolymer latex. To this methyl methacrylate was graft polymerized. After polymerization, polymer scales were found deposited on the surfaces of the inside walls of the reactor, an agitator, and baffle-plates when the polymer latex was taken out. After washing of the scales with water, the first step cleaning was conducted with a cleaning solution of the following composition with polypropylene tellerette (dia. 4.5 cm) added in a quantity of 10 v/v % based on the total cleaning solution:

| Cleaning chemicals | Concentration (w/v %) |
|---|---|
| Sodium metasilicate ($Na_2SiO_3.9H_2O$) | 4.0 |
| Caustic soda (NaOH) | 1.0 |
| Sodium salt of $\beta$-naphthalenesulfonic acid-formaldehyde condensate (anionic surfactant) | 0.5 |
| Toluene | 1:1 |
| Toluene layer: water layer (vol:vol) | |

After agitating the cleaning chemicals at 80° C. for 6 hours, they were further agitated for 6 hours at 60° C. with an addition of 0.5 w/v % based on the water layer of semihardened potassium soap of beef tallow fatty acid. As a result all the scales deposited on the inside walls of the reactor, agitator, and baffle-plates were naturally peeled off.

COMPARATIVE EXAMPLE 1

A scale deposition preventing agent of a quinone-amine compound was applied to the inside surfaces, agitator shaft and blades, and baffle-plates of a 3-l stainless steel polymerization reactor with agitator, and dried. Then, in the reactor, methyl methacrylate was graft polymerized to styrene-butadiene copolymer latex. After 12 repetitions of the polymerization, a thin deposit of the polymer scale was found on the inside walls when the polymer was taken out. After washing the scales with water, chemical cleaning was applied to the scales with the following cleaning chemicals:

| Cleaning chemicals | Concentration (w/v %) |
|---|---|
| Sodium metasilicate ($Na_2SiO_3.9H_2O$) | 4.0 |
| Caustic soda (NaOH) | 1.0 |
| Semihardened potassium soap of beef tallow fatty acid (anionic surfactant) | 0.5 |

The cleaning chemicals were agitated at 85° C. for 6 hours. About ⅔ of the scales deposited on the inside walls were naturally peeled off, but the remaining ⅓ were not peeled until tap water was jetted thereon from a hose.

COMPARATIVE EXAMPLE 2

In a 100-l stainless steel polymerization reactor with agitator, styrene and butadiene were emulsion polymerized to prepare styrene-butadiene copolymer latex. To this, methyl methacrylate was further graft polymerized. After polymerization, polymer scales were found deposited on the inside walls of the reactor, agitator, and baffle-plates when the polymer latex was taken out.

After washing of the scales with water, a chemical cleaning was applied with cleaning chemicals of the following composition:

| Cleaning chemicals | Concentration (w/v %) |
|---|---|
| Sodium metasilicate ($Na_2SiO_3.9H_2O$) | 4.0 |
| Caustic soda (NaOH) | 1.0 |
| Sodium salt of $\beta$-naphthalenesulfonic acid-formaldehyde condensate (anionic surfactant) | 0.5 |

After agitating the cleaning chemicals at 80° C. for 6 hours, they were further agitated for 6 hours at 60° C. with an addition of semihardened potassium soap of beef tallow fatty acid in a quantity of 0.5 w/v % based on the quantity of water layer. A part of the scales deposited on the inside surface of the reactor naturally peeled off from the wall surface, but remaining scales were not peeled off until tap water was jetted thereon from a hose.

COMPARATIVE EXAMPLE 3

In a 100-l stainless steel polymerization reactor with agitator, styrene and butadiene were emulsion polymerized to give styrene-butadiene copolymer. To this, methyl methacrylate was further graft polymerized. After polymerization, polymer scales were found deposited on the inside walls of the reactor when the polymer latex was taken out.

After washing of the scales with water, chemical cleaning was applied with cleaning chemicals of the following composition:

| Cleaning chemicals | Concentration (w/v %) |
|---|---|
| Sodium metasilicate ($Na_2SiO_3.9H_2O$) | 4.0 |
| Caustic soda (NaOH) | 1.0 |

| Cleaning chemicals | Concentration (w/v %) |
|---|---|
| Sodium salt of β-naphthalenesulfonic acid-formaldehyde condensate (anionic surfactant) | 0.5 |
| Toluene Toluene layer: water layer (vol:vol) | 1:1 |

After being agitated at 80° C. for 6 hours, the cleaning chemicals were further agitated for 6 hours at 60° C. with an addition of semihardened potassium soap of beef tallow fatty acid in a quantity of 0.5 w/v % based on the quantity of water layer. As a result, most of the scales deposited on the inside surfaces of the reactor naturally peeled off from the wall surface, but the remaining scales did not peel off until tap water was jetted thereon from a hose.

EXAMPLE 4

Into a 5-l stainless steel polymerization reactor with agitator, 1.5 l of water and 1.5 kg of styrene monomer were fed, and, by use of 0.3 parts (PHR) of benzoyl peroxide as an initiator and 0.1 part (PHR) of polyvinyl alcohol as a dispersant, the styrene was suspension polymerized by agitating at 85° C. for 8 hours. When the polymer latex was taken out after polymerization had been completed, polymer scales were found deposited around the gas-liquid interface.

Chemical cleaning was applied with the following cleaning chemicals:

| Cleaning chemicals | Concentration (w/v %) |
|---|---|
| Sodium metasilicate ($Na_2SiO_3 \cdot 9H_2O$) | 4.0 |
| Caustic soda (NaOH) | 1.0 |
| Semi-hardened potassium soap of beef tallow fatty acid (anionic surfactant) | 0.5 |
| Toluene Toluene layer: water layer (vol:vol) | 1:1 |

The cleaning chemicals were agitated at 65° C. for 6 hours. As a result, most of the scales deposited on the inside walls of the reactor were peeled off, and the rest of the scales were also readily peeled off by tap water jetted thereon from a hose.

EXAMPLE 5

Into a 3-l polymerizing reactor made of stainless steel with an agitator, 1.0 l of water and 1.0 kg of vinylchloride monomer were fed, and by use of sodium lauryl sulfate and in the presence of a redox catalyst comprising hydrogen peroxide and sodium sulfite, the vinyl chloride was emulsion polymerized. When the polymer latex was taken out after polymerization was complete, polymer scales were found deposited on the inside walls of the reactor.

Chemical cleaning was applied with the following cleaning chemicals:

| Cleaning chemicals | Concentration (w/v %) |
|---|---|
| Sodium metasilicate ($Na_2SiO_3 \cdot 9H_2O$) | 4.0 |
| Caustic soda (NaOH) | 1.0 |
| Semi-hardened potassium soap of beef tallow fatty acid (anionic surfactant) | 0.5 |
| Toluene Toluene layer: water layer (vol:vol) | 1:1 |

The cleaning chemicals were agitated at 65° C. for 6 hours. As a result, most of the scales deposited on the walls of the reactor were peeled off, and the rest of the scales were also readily peeled off by tap water jetted thereon from a hose.

EXAMPLE 6

Into a 3-l polymerization reactor made of stainless steel with an agitator, 1.5 l of water, 500 g of acrylonitrile, and 500 g of vinyl chloride were fed, and by use of 0.3 parts (PHR) of potassium persulfate as an initiator and in the presence of 0.05 parts of sodium alkylbenzene sulfonate as a surfactant, the acrylonitrile and vinyl chloride were emulsion polymerized. When the polymer latex was taken out after the polymerization had been completed, polymer scales were found deposited on the inside walls of the reactor.

Chemical cleaning was applied with the following cleaning chemicals:

| Cleaning chemicals | Concentration (w/v %) |
|---|---|
| Sodium metasilicate ($Na_2SiO_3 \cdot 9H_2O$) | 4.0 |
| Caustic soda (NaOH) | 1.0 |
| Semi-hardened potassium soap of beef tallow fatty acid (anionic surfactant) | 0.5 |
| Toluene Toluene layer: water layer (vol:vol) | 1:1 |

The cleaning chemicals were agitated at 65° C. for 6 hours. As a result, the scales deposited on the inside walls of the reactor were readily peeled off when tap water was jetted thereon from a hose.

EXAMPLE 7

Into a 3-l stainless steel polymerization reactor with agitator, 1.5 l of water and 1.0 kg of vinyl chloride monomer were fed, and by use of 0.04 parts (PHR) polyvinyl alcohol as a dispersant and 0.3 parts (PHR) lauroyl peroxide as an initiator, the vinyl chloride was suspension polymerized. When the polymer suspension was taken out from the reactor after the polymerization had been completed, polymer scales were found deposited on the inside walls of the reactor.

Chemical cleaning was applied by use of the following cleaning chemicals:

| Cleaning chemicals | Concentration (w/v %) |
|---|---|
| Sodium metasilicate ($Na_2SiO_3 \cdot 9H_2O$) | 4.0 |
| Caustic soda (NaOH) | 1.0 |
| Semi-hardened potassium soap of beef tallow fatty acid (anionic surfactant) | 0.5 |
| Toluene Toluene layer: water layer (vol:vol) | 1:1 |

The cleaning chemicals were agitated at 65° C. for 6 hours. As a result, most of the scales deposited on the inside walls of the reactor were naturally peeled off, and remaining scales were also readily peeled by tap water jetted from a hose.

What is claimed is:

1. In a method of cleaning an interior such as inside walls, an agitator, and baffle-plates of a polymerization reactor used in emulsion or suspension polymerization of at least one polymerizable monomer in the presence of an initiator, the improvement comprising cleaning the interior with an aqueous detergent consisting essentially of at least one member of soap builders comprising sodium or postassium compounds, at least one member of alkali agents, an aqueous solution or dispersion of a surfactant, and at least one member selected from the group consisting of an toluene, benzene, zylene, mixtures thereof, and methyl methacrylate.

2. A method as in claim 1, wherein said soap builder is at least one member selected from the group consisting of sodium metasilicate, potassium metasilicate, sodium orthosilicate, and potassium orthosilicate, and the alkali agent is at least one member selected from the group consisting of caustic soda, caustic potash, sodium carbonate, potassium carbonate, sodium bicarbonate, and potassium bicarbonate.

3. A method as in claim 1, wherein said soap builder is at least one member selected from the group consisting of sodium metasilicate and potassium metasilicate, and said alkali agent is at least one member selected from the group consisting of caustic soda and caustic potash.

4. A method as in claim 1, wherein said surfactant is selected from the group consisting of anionic and nonionic surfactants.

5. A method as in claim 1, wherein the concentration of said soap builder is 0.01–50 w/v %.

6. A method as in claim 5, wherein said concentration of the soap builder is 0.01–30 w/v %.

7. A method as in claim 6, wherein said concentration of the soap builder is 0.5–10 w/v %.

8. A method as in claim 1, wherein the concentration of said surfactant is 0.01–10 w/v %.

9. A method as in claim 8, wherein said concentration of the surfactant is 0.1–5 w/v %.

10. A method as in claim 9, wherein said concentration of the surfactant is 0.3–2 w/v %.

11. A method as in claim 1, wherein the ratio of the quantity of organic solvent and/or polymerizable monomer to the quantity of aqueous detergent is 1:0.01–10.

12. A method as in claim 11, wherein said ratio of the quantity of organic solvent and/or polymerizable monomer to the quantity of aqueous detergent is 1:0.1–3.

13. A method as in claim 12, wherein said ratio of the quantity of organic solvent and/or polymerizable monomer to the quantity of aqueous detergent is 1:0.3–1.

14. A method as in claim 1, wherein said organic solvent is selected from the group consisting of toluene and xylene.

15. A method as in claim 1, wherein said organic solvent is toluene.

16. A method as in claim 1, in which the soap builder is at least one member selected from the group consisting of sodium metasilicate, sodium orthosilicate, sodium silicate, sodium orthophosphate, sodium pyrophosphate, sodium tripolyphosphate, sodium hexametaphosphate and potassium metasilicate.

17. A method as in claim 1, in which the surfactant is at least one member selected from the group consisting of semihardened potassium soap of beef tallow fatty acid, semihardened sodium soap of beef tallow fatty acid, potassium soap of oleic acid, potassium soap of castor oil, sodium soap of stearic acid, solid bar sodium soap of mixed fatty acids, solid flake sodium soap of mixed fatty acids, sodium salt of β-naphthalenesulfonic acid-formaldehyde condensate, sodium alkylnaphthalenesulfonate, sodium dialkylsulfosuccinate, sodium alkyldiphenyl ether disulfonate, polyoxyethylene nonylphenyl ether, polyoxyethylene octylphenyl ether, lauryl betaine and lauryldimethylamine oxide.

18. In a method of cleaning an interior such as inside walls, an agitator, and baffle-plates of a polymerization reactor used in emulsion or suspension polymerization of at least one polymerizable monomer in the presence of an initiator, the improvement comprising agitating in the presence of a plastic packing an aqueous detergent consisting essentially of at least one member of soap builders, at least one member of alkali agents comprising sodium compounds and postassium compounds, an aqueous solution or dispersion of a surfactant, and at least one member selected from the group consisting of toluene, benzene, xylene, mixtures thereof, and methyl methacrylate.

19. A method as in claim 18, wherein said soap builder is at least one member selected from the group consisting of sodium metasilicate, potassium metasilicate, sodium orthosilicate, and potassium orthosilicate, and said alkali agent is at least one member selected from the group consisting of caustic soda, caustic potash, sodium carbonate, potassium carbonate, sodium bicarbonate, and potassium bicarbonate.

20. A method as in claim 18, wherein said soap builder is at least one member selected from the group consisting of sodium metasilicate and potassium metasilicate, and said alkali agent is at least one member selected from the group consisting of caustic soda and caustic potash.

21. A method as in claim 18, wherein said surfactant is selected from the group consisting of anionic and nonionic surfactants.

22. A method as in claim 18, wherein the concentration of said soap builder is 0.01–50 w/v %.

23. A method as in claim 22, wherein said concentration of the soap builder is 0.1–30 w/v %.

24. A method as in claim 23, wherein said concentration of the soap builder is 0.5–10 w/v %.

25. A method as in claim 18, wherein the concentration of said surfactant is 0.01–10 w/v %.

26. A method as in claim 25, wherein said concentration of the surfactant is 0.1–5 w/v %.

27. A method as in claim 26, wherein said concentration of the surfactant is 0.3–2 w/v %.

28. A method as in claim 18, wherein the ratio of the quantity of organic solvent and/or polymerizable monomer to quantity of the aqueous detergent is 1:0.01–10.

29. A method as in claim 28, wherein said ratio of the quantity of organic solvent and/or polymerizable monomer to the quantity of aqueous detergent is 1:0.1–3.

30. A method as in claim 29, wherein said ratio of the quantity of organic solvent and/or polymerizable monomer to the quantity of aqueous detergent is 1:0.3–1.

31. A method as in claim 18, wherein said plastic packing is at least one member selected from the group consisting of tellerette, ballast saddle, ballast ring and cascade mini ring made of polypropylene or polyethylene.

32. A method as in claim 18, wherein the quantity of plastic packing used is 0.1–50 v/v % based on the total volume of aqueous detergent.

33. A method as in 32, wherein the quantity of plastic packing used in 1–30 v/v % based on the total volume of aqueous detergent.

34. A method as in claim 18, wherein said organic solvent is selected from the group consisting of toluene and xylene.

35. A method as in claim 18, wherein said organic solvent is toluene.

36. A method as in claim 18, in which the alkali agent is at least one member selected from the group consisting of caustic soda, caustic potash, sodium carbonate, potassium carbonate, sodium bicarbonate and potassium bicarbonate.

37. A method as in claim 36, in which the surfactant is at least one member selected from the group consisting of semihardened potassium soap of beef tallow fatty acid, semihardened sodium soap of beef tallow fatty acid, potassium soap of oleic acid, potassium soap of castor oil, sodium soap of stearic acid, solid bar sodium soap of mixed fatty acids, solid flake sodium soap of mixed fatty acids, sodium salt of β-naphthalenesulfonic acid-formaldehyde condensate, sodium alkylnaphthalenesulfonate, sodium dialkylsulfosuccinate, sodium alkyldiphenyl ether disulfonate, polyoxyethylene nonylphenyl ether, polyoxyethylene octylphenyl ether, lauryl betaine and lauryldimethylamine oxide.

38. A method as in claim 18, in which the soap builder is at least one member selected from the group consisting of sodium metasilicate, sodium orthosilicate, sodium silicate, sodium orthophosphate, sodium pyrophosphate, sodium tripolyphosphate, sodium hexametaphosphate and potassium metasilicate.

39. A method as in claim 18, in which the alkali agent is at least one member selected from the group consisting of caustic soda, caustic potash, sodium carbonate, potassium carbonate, sodium bicarbonate and potassium bicarbonate.

40. A method as in claim 18, in which the surfactant is at least one member selected from the group consisting of semihardened potassium soap of beef tallow fatty acid, semihardened sodium soap of beef tallow fatty acid, potassium soap of oleic acid, potassium soap of castor oil, sodium soap of stearic acid, solid bar sodium soap of mixed fatty acids, solid flake sodium soap of mixed fatty acids, sodium salt of β-naphthalenesulfonic acid-formaldehyde condensate, sodium alkylnaphthalenesulfonate, sodium dialkylsulfosuccinate, sodium alkyldiphenyl ether disulfonate, polyoxyethylene nonylphenyl ether, polyoxyethylene octylphenyl ether, lauryl betaine and lauryldimethylamine oxide.

41. A method as in claim 39, in which the surfactant is at least one member selected from the group consisting of semihardened potassium soap of beef tallow fatty acid, semihardened sodium soap of beef tallow fatty acid, potassium soap of oleic acid, potassium soap of castor oil, sodium soap of stearic acid, solid bar sodium soap of mixed fatty acids, solid flake sodium soap of mixed fatty acids, sodium salt of β-naphthalenesulfonic acid-formaldehyde condensate, sodium alkylnaphthalenesulfonate, sodium dialkylsulfosuccinate, sodium alkyldiphenyl ether disulfonate, polyoxyethylene nonylphenyl ether, polyoxyethylene octylphenyl ether, lauryl betaine and lauryldimethylamine oxide.

* * * * *